(12) United States Patent
Bader

(10) Patent No.: US 8,961,916 B1
(45) Date of Patent: Feb. 24, 2015

(54) METHODS TO CONTROL FLUE GAS AND INORGANICS PRECIPITATION

(76) Inventor: Mansour S. Bader, College Station, TX (US)

(*) Notice: Subject to any disclaimer, the term of this patent is extended or adjusted under 35 U.S.C. 154(b) by 442 days.

(21) Appl. No.: 13/507,141

(22) Filed: Jun. 7, 2012

(51) Int. Cl.
*B01D 53/50* (2006.01)

(52) U.S. Cl.
USPC ............ 423/242.1; 423/243.01; 423/243.07; 423/243.08

(58) Field of Classification Search
USPC ............... 423/242.1, 243.01, 243.07, 243.08
See application file for complete search history.

(56) References Cited

U.S. PATENT DOCUMENTS 4,157,988 A * 6/1979 Pessel ........................... 252/184
4,162,299 A * 7/1979 Takeyama et al. ....... 423/243.01
5,686,053 A * 11/1997 Kikkawa et al. ......... 423/243.01
8,197,696 B1   6/2012 Bader

FOREIGN PATENT DOCUMENTS

CN    102731349 A * 10/2012
DE    34 45 163 A1 * 6/1986 ............... 423/243.08

* cited by examiner

*Primary Examiner* — Timothy Vanoy

(57) ABSTRACT

This invention presents innovative methods for desulfurizing flue gas in conjunction with selective inorganics recovery using calcium chloroaluminate or calcium chloroferrate as a layered double hydroxide reagent. One of the aspects of such methods is based on scrubbing $SO_2$ in a standalone closed loop. Further aspects of such methods are based on scrubbing $SO_2$ by the natural alkalinity of a saline stream as a once-through sink along with controlled precipitation of magnesium hydroxide and a calcium-based mineral in a standalone basis; or in conjunction with desalination methods and/or enhanced hydrocarbons recovery.

19 Claims, 3 Drawing Sheets

METHODS TO CONTROL FLUE GAS AND INORGANICS PRECIPITATION

BACKGROUND OF THE INVENTION

Flue gas desulfurization ($SO_2$) and sequestration ($CO_2$) can be achieved by minerals absorption. $Mg(OH)_2$ and $Ca(OH)_2$, as scrubbing agents, are of considerable interests. They possess high chemical reactivity due to their high surface areas. The reaction of $Mg(OH)_2$ with flue gas at its exhaust's temperature (150° C.) and after pre-oxidation of NO to $NO_2$ (the ratio of $SO_2$ to $NO_2$ should be greater than 5), takes place as follows:

$$CO_2 + Mg(OH)_2 \rightarrow MgCO_3 + H_2O \quad (1)$$

$$SO_2 + Mg(OH)_2 \rightarrow MgSO_3 + H_2O \quad (2)$$

$$SO_2 + MgSO_3 + H_2O \rightarrow Mg(HSO_3)_2 \quad (3)$$

$$NO_2 + 2MgSO_3 \rightarrow 2MgSO_4 + \tfrac{1}{2}N_2 \quad (4)$$

At 150° C., $MgCO_3$ (Eq. 1) is readily thermally broken down:

$$MgCO_3 \rightarrow MgO + CO_2 \uparrow \quad (5)$$

MgO (Eq. 5) can be hydrated to $Mg(OH)_2$ and the near pure $CO_2$ can be used, for instance, as a supercritical fluid to enhance heavy oil recovery. The soluble magnesium salts (Eqs. 2-4) can also be regenerated to produce $Mg(OH)_2$ for reuse. As such, the reaction by-products are readily re-generable (MgO) and soluble (magnesium sulfite and sulfate), which are added advantages of using $Mg(OH)_2$ as a scrubbing agent.

Similarly, the reaction of $Ca(OH)_2$ with flue gas takes place as follows:

$$CO_2 + Ca(OH)_2 \rightarrow CaCO_3 + H_2O \quad (6)$$

$$SO_2 + Ca(OH)_2 \rightarrow CaSO_3 + H_2O \quad (7)$$

$$SO_2 + CaSO_3 + H_2O \rightarrow Ca(HSO_3)_2 \quad (8)$$

$$NO_2 + 2CaSO_3 \rightarrow 2CaSO_4 + \tfrac{1}{2}N_2 \quad (9)$$

At 150° C., $CaCO_3$ (Eq. 6) is also readily thermally broken down:

$$CaCO_3 \rightarrow CaO + CO_2 \uparrow \quad (10)$$

and CaO (Eq. 10) can be hydrated to $Ca(OH)_2$. However, the major disadvantage of using $Ca(OH)_2$ as a flue gas scrubbing agent is the generation of the sparingly soluble hydrates of calcium sulfate that requires a further treatment and/or an appropriate disposal path.

The scrubbing of $SO_2$ in a standalone closed loop using calcium chlorofoaluminate or calcium chloroferrate, as a layered double hydroxide rich with $Ca(OH)_2$ crystals, is one of the aspects of this invention.

Alternatively, the use of seawater in a once-through basis to scrub $SO_2$ and covert it to sulfite relies on the appreciable aqueous limit of $SO_2$ and the natural alkalinity of seawater to nearly neutralize the pH of the spent seawater. However, considerable amounts of seawater are needed for $SO_2$ scrubbing. In addition, the spent seawater is richer with sulfite than seawater and thus it's depleted of oxygen. As such, the spent seawater requires: (1) aeration to convert sulfite to sulfate and thus re-adjust the oxygen content; and (2) dilution with further significant amounts of seawater to insure pH neutrality and minimize gypsum precipitation.

The scrubbing of $SO_2$ using the natural alkalinity of saline streams (seawater and the like) as a once-through sink with controlled precipitation of $Mg(OH)_2$ and calcium minerals in a standalone basis; or in conjunction with seawater desalination and/or enhanced oil recovery (injection of de-sulfated saline stream or $CO_2$) are further aspects of this invention.

SUMMARY OF THE INVENTION

In one aspect, the present invention provides a method for scrubbing sulfur dioxide from flue gas using an aqueous stream enriched with calcium chloroaluminate or calcium chloroferrate. The inventive method comprises the steps of: (a) injecting flue gas into a precipitator through at least one nozzle; (b) injecting an aqueous stream enriched with calcium chloroaluminate or calcium chloroferrate into the precipitator through at least one nozzle to react sulfur dioxide with calcium hydroxide crystals from chloroaluminate or calcium chloroferrate to form precipitates comprising calcium sulfoaluminate or calcium sulfoferrate; (c) injecting an amine solvent into the precipitator through at least one nozzle to enhance precipitates of calcium sulfoaluminate or calcium sulfoferrate; (d) liberating carbon dioxide in a near pure form from said flue gas; (e) removing precipitates of calcium sulfoaluminate or calcium sulfoferrate from the aqueous stream or by filtering; (f) removing at least most of the amine solvent from the aqueous stream by stripping; and (g) recycling the aqueous stream and amine solvent to the precipitator.

The aqueous stream can be potable water, blow down stream from cooling tower, brackish water, seawater, brine from seawater desalination plants, concentrate saline water from evaporation ponds or solar ponds or salt-gradient solar ponds, natural brine, produced water, spent water from flue gas desulphurization, or a combination thereof. The amine solvent is selected from the group consisting of isopropylamine, propylamine, dipropylamine, diisopropylamine, ethylamine, diethylamine, methylamine, dimethylamine, or a combination thereof.

In yet another aspect, the present invention provides a method for scrubbing sulfur dioxide from flue gas using an aqueous stream enriched with calcium chloroaluminate or calcium chloroferrate. The inventive method comprises the steps of: (a) injecting flue gas into a precipitator through at least one nozzle; (b) injecting an aqueous stream enriched with calcium chloroaluminate or calcium chloroferrate into the precipitator through at least one nozzle to react sulfur dioxide with calcium hydroxide crystals from chloroaluminate or calcium chloroferrate to form precipitates comprising calcium sulfoaluminate or calcium sulfoferrate; (c) liberating carbon dioxide in a near pure form from flue gas; (d) removing precipitates of calcium sulfoaluminate or calcium sulfoferrate from the aqueous stream or by filtering; and (e) recycling the aqueous stream to the precipitator.

In yet another aspect, the present invention provides a method for scrubbing sulfur dioxide from flue gas and precipitating magnesium hydroxide and calcium minerals from a saline stream to produce saline stream that is only rich with sodium-potassium chloride. The inventive method comprises the steps of: (a) reacting flue gas with a saline stream to absorb and convert sulfur dioxide to sulfite, liberate carbon dioxide in a near pure form, and produce alkalinity-free saline stream; (b) removing magnesium hydroxide from the alkalinity-free saline stream; (c) removing calcium minerals from the magnesium-free saline stream to produce saline stream that is only rich with sodium-potassium chloride; (d) feeding the saline stream that is only rich with sodium-potassium chloride to desalination methods; or (e) injecting the final blow down brine from desalination methods into oil-fields for enhanced oil recovery; or (f) injecting the saline stream that is only rich with sodium-potassium chloride into oil-fields for enhanced oil recovery. Magnesium hydroxide is removed from the alkalinity-free saline stream in step (b) by: (i) adding calciumchloroaluminate or calcium chloroferrate to the alkalinity-free saline stream and injecting it into a first precipitator through at least one nozzle to form precipitates comprising magnesium hydroxide; (ii) injecting an amine solvent into the first precipitator through at least one nozzle to enhance precipitates comprising magnesium hydroxide; (iii) removing precipitates from the alkalinity-free saline stream by filtering to produce slurry of magnesium hydroxide, and magnesium-free saline stream; and (iv) washing, filtering and drying of magnesium hydroxide slurry. Calcium minerals are removed from the magnesium-free saline stream in step (c) by: (i) adding calcium chloroaluminate or calcium chloroferrate to the magnesium-free saline stream and injecting it into a second precipitator through at least one nozzle to form precipitates comprising calcium sulfoaluminate or calcium sulfoferrate; (ii) removing precipitates from the magnesium-free saline stream by filtering to produce slurry of calcium sulfoaluminate or calcium sulfoferrate, and saline stream that is only rich with sodium-potassium chloride; (iii) washing, filtering and drying of the slurry of calcium sulfoaluminate or calcium sulfoferrate; and (iv) removing at least most of the amine solvent from the saline stream that is only rich with sodium-potassium chloride by stripping.

Saline water is seawater, brine from seawater desalination plants, concentrate saline water from evaporation ponds or solar ponds or salt-gradient solar ponds, natural brine, spent water from flue gas desulphurization, agricultural drainage water, or a combination thereof. Desalination methods are multi-stage flash, multi-effect, vapor-recompression, reverse osmosis, nanofiltration, vacuum membrane distillation, direct contact membrane distillation, membrane osmotic distillation, or a combination thereof.

In yet another aspect, the present invention provides a method for scrubbing sulfur dioxide from flue gas and precipitating magnesium hydroxide and calcium minerals from a saline stream to produce saline stream that is only rich with sodium-potassium chloride. The inventive method comprises the steps of: (a) reacting flue gas with a saline stream to absorb and convert sulfur dioxide to sulfite, liberate carbon dioxide in a near pure form, and produce alkalinity-free saline stream; (b) removing magnesium hydroxide from the alkalinity-free saline stream; (c) removing calcium minerals from the magnesium-free saline stream to produce saline stream that is only rich with sodium-potassium chloride; (d) feeding the saline stream that is only rich with sodium-potassium chloride to desalination methods; or (e) injecting the final blow down brine from desalination methods into oil-fields for enhanced oil recovery; or (f) injecting the saline stream that is only rich with sodium-potassium chloride into oil-fields for enhanced oil recovery. Magnesium hydroxide is removed from the alkalinity-free saline stream in step (b) by: (i) adding calcium chloroaluminate or calcium chloroferrate to the alkalinity-free saline stream and injecting it into a first precipitator through at least one nozzle to form precipitates comprising magnesium hydroxide; (ii) removing precipitates from the alkalinity-free saline stream by filtering to produce slurry of magnesium hydroxide and magnesium-free saline stream; and (iii) washing, filtering and drying of magnesium hydroxide slurry. Calcium minerals are removed from the magnesium-free saline stream in step (c) by: (i) adding calcium chloroaluminate or calcium chloroferrate to the magnesium-free saline stream and injecting it into a second precipitator through at least one nozzle to form precipitates comprising calcium sulfoaluminate or calcium sulfoferrate; (ii) removing precipitates from the magnesium-free saline stream by filtering to produce slurry of calcium sulfoaluminate or calcium sulfoferrate, and saline stream that is only rich with sodium-potassium chloride; and (iii) washing, filtering and drying of the slurry of calcium sulfoaluminate or calcium sulfoferrate.

In yet another aspect, the present invention provides a method for scrubbing sulfur dioxide from flue gas and precipitating magnesium hydroxide and calcium minerals from a saline stream to produce saline stream that is only rich with sodium-potassium chloride. The inventive method comprises the steps of (a) reacting flue gas with the saline stream to absorb and convert sulfur dioxide to sulfite, liberate carbon dioxide in a near pure form, and produce alkalinity-free saline stream; (b) removing magnesium hydroxide and calcium minerals from the alkalinity-free saline stream to produce saline stream that is only rich with sodium-potassium chloride; (c) feeding the saline stream that is only rich with sodium-potassium chloride to desalination methods; (d) injecting the final blow down brine from desalination methods into oil-fields for enhanced oil recovery; or (e) injecting the saline stream that is only rich with sodium-potassium chloride into oil-fields for enhanced oil recovery. The removal of magnesium hydroxide and calcium minerals in step (b) by: (i) adding calcium chloroaluminate or calcium chloroferrate to the alkalinity-free saline stream and injecting it into a first precipitator through at least one nozzle to form precipitates comprising magnesium hydroxide, and calcium sulfoaluminate or calcium sulfoferrate; (ii) injecting an amine solvent into the first precipitator through at least one nozzle to enhance precipitates comprising magnesium hydroxide, and calcium sulfoaluminate or calcium sulfoferrate; (iii) removing precipitates from the alkalinity-free saline stream by filtering to produce slurry of both magnesium hydroxide and calcium sulfoaluminate or calcium sulfoferrate, and the saline stream that is only rich with sodium-potassium chloride; (iv) washing, filtering and drying of the slurry of magnesium hydroxide, and calcium sulfoaluminate or calcium sulfoferrate; and (v) removing at least most of the amine solvent from the saline stream that is only rich with sodium-potassium chloride by stripping.

In yet another aspect, the present invention provides a method for scrubbing sulfur dioxide from flue gas and precipitating magnesium hydroxide and calcium minerals from a saline stream to produce saline stream that is only rich with sodium-potassium chloride. The inventive method comprises the steps of: (a) reacting flue gas with the saline stream to absorb and convert sulfur dioxide to sulfite, liberate carbon dioxide in a near pure form, and produce alkalinity-free saline stream; (b) removing magnesium hydroxide and calcium minerals from the alkalinity-free saline stream to produce saline stream that is only rich with sodium-potassium chloride; (c) feeding the saline stream that is only rich with sodium-potassium chloride to desalination methods; (d) injecting the final blow down brine from desalination methods into oil-fields for enhanced oil recovery; or (e) injecting the saline stream that is only rich with sodium-potassium chloride into oil-fields for enhanced oil recovery. The removal of magnesium hydroxide and calcium minerals in step (b) by: (i) adding calcium chloroaluminate or calcium chloroferrate to the alkalinity-free saline stream and injecting it into a first precipitator through at least one nozzle to form precipitates comprising magnesium hydroxide, and calcium sulfoaluminate or calcium sulfoferrate; (ii) removing precipitates from the alkalinity-free saline stream by filtering to produce slurry of both magnesium hydroxide and calcium sulfoaluminate or calcium sulfoferrate, and the saline stream that is only rich with sodium-potassium chloride; and (iii)

washing, filtering and drying of the slurry of magnesium hydroxide, and calcium sulfoaluminate or calcium sulfoferrate.

This invention is not restricted to use in connection with one particular application. This invention can be used, in general, for the selective removal of inorganic materials from aqueous streams with precipitates ranging from submicron to macro sizes. Further objects, novel features, and advantages of this invention will be apparent to those skilled in the art upon examining the accompanying drawings and the following description of the preferred embodiments, or may be learned by practice of this invention.

DESCRIPTION OF THE PREFERRED EMBODIMENT

The Precipitation Concept

Figure 1:
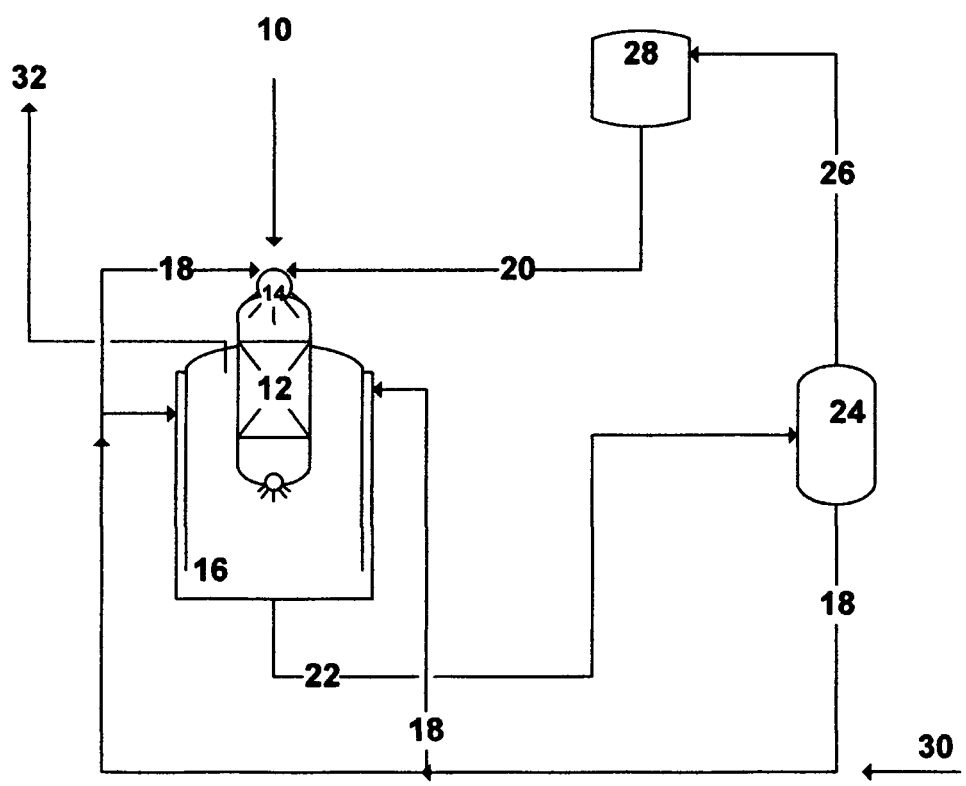
FIG. 1 illustrates a possible flow diagram for the scrubbing of $SO_2$ in a closed-loop.

I have previously invented the Liquid-Phase Precipitation (LPP) process for the separation of inorganic species from aqueous streams. The effect of the separation in the LPP process is to intermix the aqueous solution with a suitable solvent at ambient temperature and atmospheric pressure to form selective precipitates. The suitable solvents are those which have the capability to meet two basic criteria.

The first criteria is the suitability to precipitate targeted inorganic species from aqueous solutions. The selected organic solvent must be miscible with the aqueous phase. Of equal importance, the targeted inorganic species must be sparingly soluble in the organic solvent. The addition of such a solvent to an inorganic-aqueous solution leads to the capture of part of the water molecules and reduces the solubility of inorganic species in the water which form insoluble precipitates. The solubility of the targeted inorganic species in the organic solvent is a critical factor in achieving the degree of saturation. Therefore, solubility related factors such as ionic charge, ionic radius, and the presence of a suitable anion in the aqueous solution (its effect on pH rate) play an important role in affecting and characterizing precipitates formation.

The second criteria is suitability for overall process design. For ease of recovery, the selected solvent must have favorable physical properties such as low boiling point, high vapor pressure, high relative volatility, and no azeotrope formation with water. From a process design standpoint, the selected solvent must have low toxicity since traces of the organic solvent always remain in the discharge stream. Further, the selected solvent must be stable, compatible with the process, and relatively inexpensive.

Several solvents have been identified for potential use in the LPP process. These solvents are isopropylamine (IPA), ethylamine (EA), propylamine (PA), dipropylamine (DPA), diisopropylamine (DIPA), diethylamine (DEA), and dimethylamine (DMA). However, IPA is the preferred solvent because of its high precipitation ability with different inorganics, favorable properties (boiling point: 32.4° C.; vapor pressure: 478 mmHg at 20° C.); and minimal environmental risks.

Improving the performance of the precipitation process is always a target. One of the improvements is to minimize, if not eliminate, the use of the solvent, and provide a zero-liquid discharge (ZLD) process. Calcium chloroaluminate and calcium chloroferrate are thus of particular interest in this invention since they are layered double hydroxides which contain divalent and trivalent cations (calcium along with aluminum or iron) in their outside main layers while their interlayers contain anions (chloride) and water molecules. Within the outside layers, a fraction of $Ca(OH)_2$ sheets are substituted with aluminum or iron (trivalent cations), which provides permanent positive charge on the hydroxide layers. The positively charged hydroxide layers are counter-balanced by the negatively charged anion interlayers.

There are several advantages for using calcium chloroaluminate or calcium chloroferrate in this invention. First, they furnish the needed $Ca(OH)_2$ crystals for efficient flue gas absorption as well as pH elevation, which would minimize if not eliminate the use of an amine solvent. It should be pointed out that a moderate pH elevation would also trigger the precipitation $Mg(OH)_2$, from for instance a saline stream, since $Mg(OH)_2$ possesses a very limited aqueous solubility (13 mg/L at 20° C.) and an extremely short nucleation period (about one second).

Second, the anion interlayers (chloride) of calcium chloroaluminate or calcium chloroferrate are highly exchangeable. Sulfate (or sulfite), as a divalent anion and a by-product of $SO_2$ absorption (Eqs. 7-9), would have a higher affinity to replace chloride (as a monovalent anion) to bind with calcium-aluminum or calcium-iron and thus form extremely insoluble calcium sulfoaluminate or calcium sulfoferrate (their solubility limits are about 1 mg/L at 20° C. and their nucleation periods are very rapid). This would resolve the generation of spent aqueous stream from the desulfurization process, as a result of using $Ca(OH)_2$ alone as a scrubbing agent (Eqs. 6-10), that is typically rich with the sparingly soluble calcium sulfate hydrates and requires further treatment and/or suitable disposal path.

Third, calcium chloroaluminate or calcium chloroferrate can be produced locally from, for instance, oil-fields produced water and the like as given in one of my inventions.

A further process improvement is to produce controllable precipitates that are uniformly distributed with high yield and preferably in submicron sizes. Submicron precipitates are fundamentally stable and form spontaneously if a narrow resistance time distribution is improvised and/or a surface active agent (naturally existing or induced) sufficiently acts as a dispersant to prevent immediate agglomeration of the newly formed precipitates. Submicron precipitates are thus dispersed phase with extreme fluxionality. On the other hand, non-spontaneous unstable macro-size precipitates will form if given sufficient time to rest.

The state (stabile, metastabe, or unstable) of given precipitates can be expressed thermodynamically by the Gibbs-Helmholtz relation as follows:

$$\Delta G = \Delta H - T \Delta S \qquad (11)$$

where $\Delta G$ is precipitates free energy (provided by, for instance, mechanical agitation or other means), $\Delta H$ is the enthalpy that represents the binding energy of the dispersed phase precipitates in the aqueous stream, T is the temperature, and $\Delta S$ is the entropy of the dispersed phase precipitates (the state of precipitates disorder). The binding energy ($\Delta H$) can be expressed in terms of the surface tension (τ) and the increase in the surface area (ΔA) as follows:

$$\Delta G = \tau \Delta A - T \Delta S \tag{12}$$

When the introduced free energy into the aqueous stream exceeds the binding energy of precipitates, individual precipitates are broken down and redistributed. In addition, when a surface active agent is present in the aqueous stream as an effective dispersant, r is reduced and thus the precipitates binding energy is diminished. Furthermore, part of the introduced energy may not contribute to precipitates deflocculating but it dissipates in the aqueous stream in the form of heat which reduces viscosity. All of these factors increase precipitates disorder (positive entropy). As such, the change in the entropy (ΔS) quantitatively defines precipitates dispersion.

Absorption of $SO_2$ in a Closed Loop

As shown in FIG. 1, the absorption of $SO_2$ can take a place in a closed loop preferably using potable water enriched with a sufficient amount of either calcium chloroaluminate or calcium chloroferrate as a scrubbing agent. Flue gas after pre-oxidation of NO to $NO_2$ [10] will be fed to the precipitator unit [12] at its exhaust's temperature of about 150° C. and via a mixing nozzle [14]. The precipitator unit [12] will be inserted directly into the flue gas absorber unit [16]. The enriched potable water with either calcium chloroaluminate or calcium chloroferrate [18] will be delivered to the precipitator unit [12] through the same mixing nozzle. Calcium chloroaluminate or calcium chloroferrate would furnish the needed $Ca(OH)_2$ crystals for efficient flue gas absorption and pH elevation. If needed, however, an optimal and small amount of a selected amine solvent [20], to further accelerate precipitation and elevate the pH value, will also simultaneously be delivered to the precipitator unit [12] through the same mixing nozzle [14]. The adsorption of flue gas and the precipitation of calcium sulfoaluminate or calcium sulfoferrate should take place rapidly within the precipitator unit [12]. The outlet stream from the precipitator unit [12] will be diffused through the absorber unit [16] where it's mixed with further amounts of potable water [18]. Air, if needed, can also be injected at the bottom of the absorber unit [16] or the precipitator unit [12] (not shown) to ensure the complete conversion of sulfite/bisulfite to sulfate. The outlet stream [22] of the absorber unit [16] will be fed to a vacuum filter [24] to: (1) recover the amine solvent [26] and recycle it back to the amine storage tank [28]; (2) recover the precipitates of calcium sulfoaluminate or calcium sulfoferrate [30] in a near dry form; and (3) return the filtered potable water [18] back to the absorber unit [16]. Make-up potable water [32] can be added as needed. $CO_2$ [34] will be vented via the top of the absorber unit [16] which will readily be available for applications such as oil-fields enhanced oil recovery. The excess heat within the outlet stream [22] of the absorber unit [16] may also be used to re-heat the vented $CO_2$ [34] (not shown).

It should be understood that water sources such as low grade potable water (e.g., cooling tower blow down stream and the like) or low salinity water (brackish water) or even saline water (seawater and the like) can also be used. The only preference (not a limitation) is that such water sources should be depleted of, or low in, sulfate to minimize the use calcium chloroaluminate or calcium chloroferrate as a scrubbing agent.

It should also be understood that the use of the amine solvent can be eliminated from the process by relying on $Ca(OH)_2$ crystals from either calcium chloroaluminate or calcium chloroferrate for pH elevation.

Absorption of $SO_2$ and Precipitation of $Mg(OH)_2$ and Calcium Minerals $SO_2$ is an anhydride that needs to be hydrated to become an acid. Unlike other acid gases (e.g., $CO_2$), the aqueous solubility limit of $SO_2$ is about 83,200 mg/L at 25° C. As such, the absorption of $SO_2$ in water is driven by its appreciable aqueous solubility limit as well as its acid-base nature:

$$SO_2 + H_2O \Leftrightarrow H_2SO_3 \tag{13}$$

Sulfurous acid ($H_2SO_3$) is a weak acid that ionizes in two steps:

$$H_2SO_3 \Leftrightarrow HSO_3 + H \text{ (pH: between 2 and 7)} \tag{14}$$

$$HSO_3 \Leftrightarrow SO_3 + H \text{ (pH: above 7)} \tag{15}$$

The concentration of $SO_2$ and the amount of water would determine the completion or incompletion of $SO_2$ absorption in water. If a saline stream (e.g., seawater, brine from seawater desalination plants, natural brine, produced water, and the like) is used to absorb $SO_2$, the acidity of the ionized $H_2SO_3$ surplus (Eq. 13) breaks the natural alkalinity (the bicarbonate ion) of the saline stream to neutralize the surplus of hydrogen ions, release $CO_2$ (de-carbonation of the saline stream), and increase the pH (the generation of hydrogen sulfite and sulfite ion as weak bases; Eqs. 14 and 15):

$$HCO_3 + H \Leftrightarrow H_2O + CO_2 \tag{16}$$

Seawater can be used in standalone wet flue gas desulfurization systems to absorb $SO_2$. However, several drawbacks are associated with such systems. First, they require considerable amounts of seawater to accomplish the near complete absorption of $SO_2$ as well as to increase the pH of spent seawater to near neutral. Second, further considerable amounts of seawater are also required for mixing with spent seawater to insure pH neutrality. Third, the mixed stream (seawater and spent seawater) must also be aerated to complete the oxidation of the absorbed $SO_2$ (as hydrogen sulfite and sulfite ion; Eqs. 14 and 15) into irreversible sulfate ion and to increase the oxygen content (hydrogen sulfite and sulfite ion act as oxygen scavengers).

Such drawbacks, however, can be advantageous if the absorption of $SO_2$ is integrated with seawater desalinations plants since such plants also consume considerable amounts of seawater due to their low productivity (mainly due to the sulfate scale issue). In addition, most of the pre-treatment steps in conventional seawater desalination plants such as acidification (by adding sulfuric acid and the like) to convert the alkalinity of seawater to $CO_2$, the stripping of $CO_2$ from seawater, the addition of oxygen scavengers to deplete oxygen, pH re-adjustment with a caustic solution, and seawater pre-heating before evaporators could entirely be eliminated.

Further crucial benefits can also be achieved if the production of $Mg(OH)_2$ along with calcium sulfoaluminate or calcium sulfoferrate is integrated with seawater desalination plants to operate such plants in a scale-free manner (removal of both alkaline and sulfate scale) rendering seawater to be dominantly rich with only sodium-potassium chloride. This would tremendously increase plants' performance abilities, particularly thermal-driven systems. It is worth noting that the removal of $Mg(OH)_2$ along with calcium sulfoaluminate or calcium sulfoferrate spent seawater (the desulfurization step) can alternatively be integrated with oil-fields water injection operations instead of desalination plants.

Yet, further economical and environmental benefits can be achieved by utilizing the final blow down (reject) stream from desalination plants in oil-fields injection operations to enhance oil recovery since such a stream is depleted of sulfate, oxygen, suspended particles, and at no additional cost. Discharging such a stream back into the sea would: (1) increase salinity around the intake lines of desalination plants; and (2) adversely affect the marine environment (lack of oxygen combined with higher salinity, higher temperature, and concentrated toxic species such as the derivatives of boron, bromine, and chlorine). Oil-fields would thus provide the most appropriate sinks for such spent seawater to enhance oil recovery, and to protect desalination plants and the surrounding marine environment.

Figure 2:
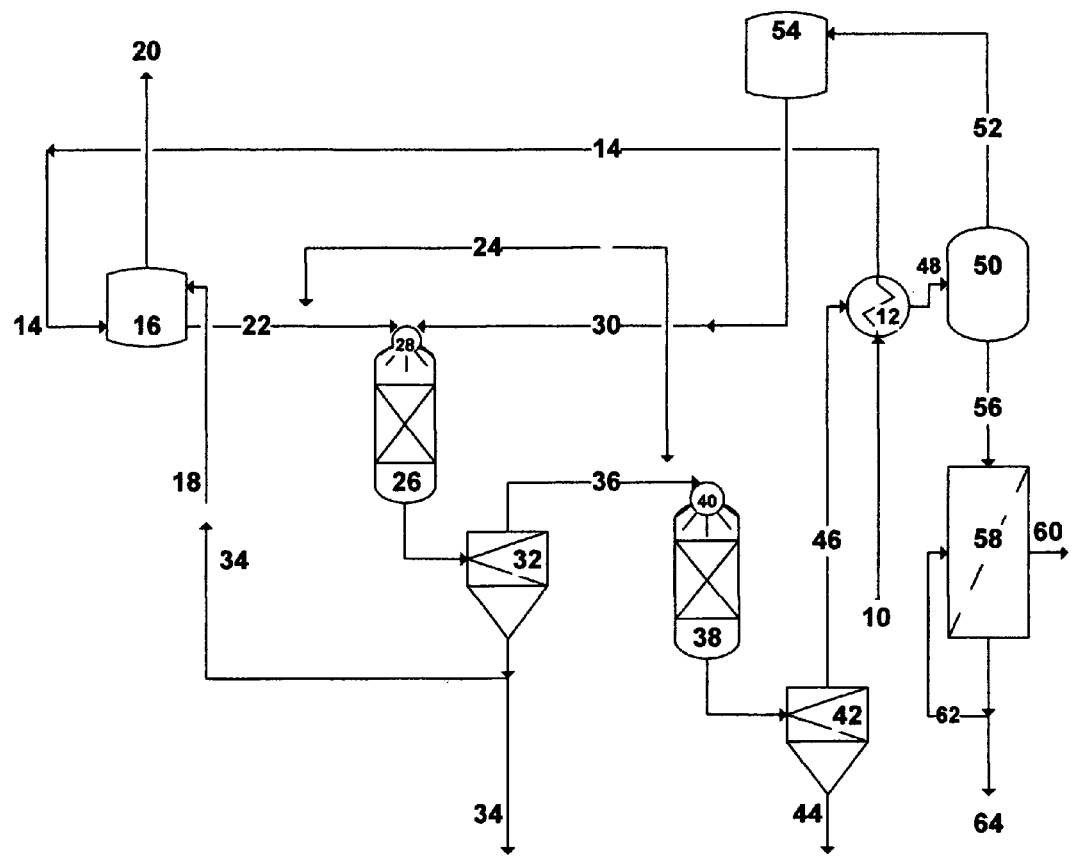
FIG. 2 illustrates a possible flow diagram for the scrubbing of $SO_2$, the precipitation of $Mg(OH)_2$, and the precipitation of calcium minerals.

Reference is now made to FIG. 2, which depicts a simplified possible flow diagram for the scrubbing of $SO_2$ and the precipitation of $Mg(OH)_2$ along with precipitation of either calcium sulfoaluminate or calcium sulfoferrate. Flue gas [10] from, for instance, power generators will pass through a heat exchanger [12] to reduce its temperature from about 150° C. to the adiabatic saturation temperature of about 50° C. Such a lower temperature of the quenched flue gas [14] allows the use of rubber lining as protection against corrosion in the $SO_2$ absorber unit [16]. Seawater [18] will be fed to the $SO_2$ absorber unit [16] to react with the quenched flue gas [14]. The segregated $CO_2$ from the flue gas along with $CO_2$ from the conversion of seawater alkalinity [20] will be vented from the top of $SO_2$ absorber unit [16].

The spent seawater [22] that contains the converted $SO_2$ to $HSO_3$ and $SO_3$ (Eqs. 14 and 15) will be and enriched with a sufficient amount of either calcium chloroaluminate or calcium chloroferrate[24] and delivered to a precipitator unit [26] preferably via a mixing nozzle [28]. The amount of either calcium chloroaluminate or calcium chloroferrate should be sufficient to trigger mainly $Mg(OH)_2$ precipitation. An optimal and small amount of a selected amine solvent, if needed, will simultaneously be delivered [30] to the precipitator unit [26] through the same mixing nozzle [28]. Since seawater in the first precipitation unit [26] is basic due to $Ca(OH)_2$ crystals as well as the injection of the amine solvent (pH >7), the absorbed $SO_2$ in the form of $SO_3$ is readily oxidized to $SO_4$:

$$SO_3 + 2OH \rightarrow SO_4 + H_2O \qquad (17)$$

The precipitator outlet stream [26] will be fed to the first primary filtration unit [32] (e.g., a vacuum filter or a centrifuge or an ultra-filter) to recover $Mg(OH)_2$ precipitates. Recovered precipitates [34] will pass through a cycle of washing, filtering and drying (not shown).

The decanted stream [36] from the first primary filtration unit [32] that is nearly alkalinity free (magnesium and bicarbonate) seawater will be enriched further with a sufficient amount of either calcium chloroaluminate or calcium chloroferrate[24] and fed to the second precipitator unit [38] via a mixing nozzle [40]. The amount of either calcium chloroaluminate or calcium chloroferrate should be sufficient to trigger the precipitation of either calcium sulfoaluminate or calcium sulfoferrate. The outlet stream from the second precipitator unit [38] will be fed to the second primary filtration unit [42] (e.g., a vacuum filter or a centrifuge or an ultra-filter) to recover the precipitates of either calcium sulfoaluminate or calcium sulfoferrate [44].

The decanted stream [46] from the second primary filtration unit [42] will pass through the heat exchanger [12] to increase its temperature [48] and thus allow near complete recovery of the amine solvent in a vapor-liquid equilibrium based stripping unit [50]. The recovered amine solvent [52] will be recycled to the solvent storage tank [54].

Since the decanted seawater [56] is pre-heated via the heat exchanger [12] and nearly free of alkaline and sulfate scales, it will thus be readily fed to seawater desalination plants (either thermal-driven or pressure-driven) [58] to produce high volume of potable water [60] via brine recycling [62]. The final brine blow down stream [64] will be diverted to oil fields injection operations for enhanced oil recovery.

It should be understood that, if needed, a sufficient portion of the $Mg(OH)_2$ precipitates [34] in a slurry form (before the final cycle of washing, filtering and drying) can be blended with seawater [18] before entering the $SO_2$ absorber unit [16] to enhance $SO_2$ absorption.

It should also be understood that a portion of the vented $CO_2$ [20] can be used for the re-carbonation of the produced potable water [60] from seawater desalination plants [58].

It should also be understood that the remaining large portion of the vented $CO_2$ [20] can be used for the enhancement of oil-fields heavy crude oil recovery as a viable supercritical fluid.

It should also be understood that the vented $CO_2$ [20] that is saturated with water and might still contain trace amounts of $SO_2$ must be reheated to above its dew point to minimize corrosion or choosing design conditions and construction materials to withstand the corrosive conditions.

It should also be understood that the heat exchanger [12] can alternatively be used to re-heat the vented $CO_2$ [20] instead of the decanted stream [50] from the second primary filtration unit [46]. Such an arrangement for the heat exchanger might be useful in the case of using pressure-driven (e.g., RO) rather than thermal-driven desalination systems. However, the potable recovery of RO (salinity sensitive) will be lower than the recovery of thermal-driven (salinity insensitive) desalination systems due to osmotic pressure limitation.

It should also be understood that the flue gas feed stream [10] can be split via two heat exchangers; one to heat the decanted stream [50] from the second primary filtration unit [46]; and the second one to re-heat the vented $CO_2$ [20].

Figure 3:
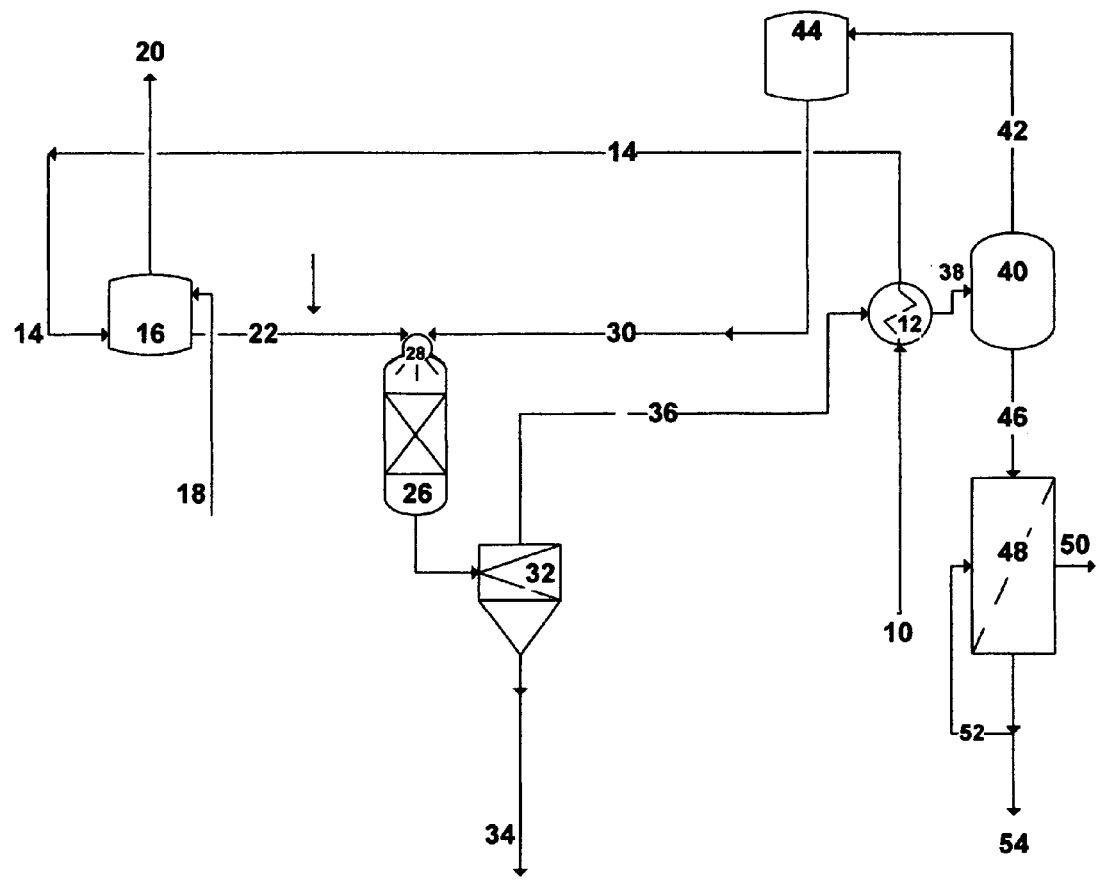
FIG. 3 illustrates a possible flow diagram for the scrubbing of $SO_2$ and the precipitation of $Mg(OH)_2$ along with calcium minerals in a single stage or the precipitation of $Mg(OH)_2$ alone in a single stage.

It should also be understood that the process as given in FIG. 2 can be truncated to absorb $SO_2$ and simultaneously precipitate $Mg(OH)_2$ along with either calcium sulfoaluminate or calcium sulfoferrate in a single stage as shown in FIG. 3.

It should also be understood that the process as given in FIG. 2 can be truncated to absorb $SO_2$ and only precipitate $Mg(OH)_2$ in a single stage as shown in FIG. 3.

It should also be understood that the steps of adding and recovering the amine solvent can be eliminated from the processes (FIGS. 2 and 3) by relying on $Ca(OH)_2$ crystals from either calcium chloroaluminate or calcium chloroferrate for pH elevation.

What is claimed is:

1. A method for scrubbing sulfur dioxide from flue gas using an aqueous stream enriched with calcium chloroaluminate or calcium chloroferrate, said method comprising the steps of:
   (a) injecting said flue gas into a precipitator through at least one nozzle;
   (b) injecting said aqueous stream said enriched with calcium chloroaluminate or calcium chloroferrate into said precipitator through at least one nozzle to react said sulfur dioxide with calcium hydroxide crystals from said chloroaluminate or calcium chloroferrate to form precipitates comprising calcium sulfoaluminate or calcium sulfoferrate;
   (c) injecting an amine solvent into said precipitator through at least one nozzle to enhance said precipitates of said calcium sulfoaluminate or calcium sulfoferrate;
   (d) liberating carbon dioxide in a near pure form from said flue gas;

(e) removing said precipitates of said calcium sulfoaluminate or calcium sulfoferrate from said aqueous stream or by filtering;

(f) removing at least most of said amine solvent from said aqueous stream by stripping;

(g) recycling said aqueous stream and said amine solvent to said precipitator.

2. The method of claim 1 wherein said aqueous stream is potable water, blow down stream from cooling tower, brackish water, seawater, brine from seawater desalination plants, concentrate saline water from evaporation ponds or solar ponds or salt-gradient solar ponds, natural brine, produced water, spent water from flue gas desulphurization, or a combination thereof.

3. The method of claim 1 wherein said amine solvent is selected from the group consisting of isopropylamine, propylamine, dipropylamine, diisopropylamine, ethylamine, diethylamine, methylamine, dimethylamine, or a combination thereof.

4. A method for scrubbing sulfur dioxide from flue gas using an aqueous stream enriched with calcium chloroaluminate or calcium chloroferrate, said method comprising the steps of:

(a) injecting said flue gas into a precipitator through at least one nozzle;

(b) injecting said aqueous stream said enriched with calcium chloroaluminate or calcium chloroferrate into said precipitator through at least one nozzle to react said sulfur dioxide with calcium hydroxide crystals from said chloroaluminate or calcium chloroferrate to form precipitates comprising calcium sulfoaluminate or calcium sulfoferrate;

(c) liberating carbon dioxide in a near pure form from said flue gas;

(d) removing said precipitates of said calcium sulfoaluminate or calcium sulfoferrate from said aqueous stream or by filtering;

(e) recycling said aqueous stream to said precipitator.

5. The method of claim 4 wherein said aqueous stream is potable water, blow down stream from cooling tower, brackish water, seawater, brine from seawater desalination plants, concentrate saline water from evaporation ponds or solar ponds or salt-gradient solar ponds, natural brine, produced water, spent water from flue gas desulphurization, or a combination thereof.

6. A method for scrubbing sulfur dioxide from flue gas and precipitating magnesium hydroxide and calcium minerals from a saline stream to produce sodium-potassium chloride saline stream, said method comprising the steps of:

(a) reacting said flue gas with said saline stream to absorb and convert said sulfur dioxide to sulfite, liberate carbon dioxide in a near pure form, and produce alkalinity-free saline stream;

(b) removing said magnesium hydroxide from said alkalinity-free saline stream by
  (i) adding calcium chloroaluminate or calcium chloroferrate to said alkalinity-free saline stream and injecting it into a first precipitator through at least one nozzle to form precipitates comprising said magnesium hydroxide;
  (ii) injecting an amine solvent into said first precipitator through at least one nozzle to enhance precipitates comprising said magnesium hydroxide;
  (iii) removing said precipitates from said alkalinity-free saline stream by filtering to produce slurry of said magnesium hydroxide, and magnesium-free saline stream;
  (iv) washing, filtering and drying of said slurry of said magnesium hydroxide;

(c) removing said calcium minerals from said magnesium-free saline stream by
  (i) adding calcium chloroaluminate or calcium chloroferrate to said magnesium-free saline stream and injecting it into a second precipitator through at least one nozzle to form precipitates comprising calcium sulfoaluminate or calcium sulfoferrate;
  (ii) removing said precipitates from said magnesium-free saline stream by filtering to produce slurry of said calcium sulfoaluminate or calcium sulfoferrate, and said sodium-potassium chloride saline stream;
  (iii) washing, filtering and drying of said slurry of said calcium sulfoaluminate or calcium sulfoferrate;
  (iv) removing at least most of said amine solvent from said sodium-potassium chloride saline stream by stripping;

(d) feeding said sodium-potassium chloride saline stream to desalination methods; or (e) injecting the final blow down brine from said desalination methods into oil-fields for enhanced oil recovery; or (f) Injecting said sodium-potassium chloride saline stream into oil-fields for enhanced oil recovery.

7. The method of claim 6 wherein said saline water is seawater, brine from seawater desalination plants, concentrate saline water from evaporation ponds or solar ponds or salt-gradient solar ponds, natural brine, spent water from flue gas desulphurization, agricultural drainage water, or a combination thereof.

8. The method of claim 6 wherein said amine solvent is selected from the group consisting of isopropylamine, propylamine, dipropylamine, diisopropylamine, ethylamine, diethylamine, methylamine, dimethylamine, or a combination thereof.

9. The method of claim 6 wherein said desalination methods are multi-stage flash, multi-effect, vapor-recompression, reverse osmosis, nanofiltration, vacuum membrane distillation, direct contact membrane distillation, membrane osmotic distillation, or a combination thereof.

10. A method for scrubbing sulfur dioxide from flue gas and precipitating magnesium hydroxide and calcium minerals from a saline stream to produce sodium-potassium chloride saline stream, said method comprising the steps of:

(a) reacting said flue gas with said saline stream to absorb and convert said sulfur dioxide to sulfite, liberate carbon dioxide in a near pure form, and produce alkalinity-free saline stream;

(b) removing said magnesium hydroxide from said alkalinity-free saline stream by
  (i) adding calcium chloroaluminate or calcium chloroferrate to said alkalinity-free saline stream and injecting it into a first precipitator through at least one nozzle to form precipitates comprising said magnesium hydroxide;
  (ii) removing said precipitates from said alkalinity-free saline stream by filtering to produce slurry of said magnesium hydroxide, and magnesium-free saline stream;
  (iii) washing, filtering and drying of said slurry of said magnesium hydroxide;

(c) removing said calcium minerals from said magnesium-free saline stream by
  (i) adding calcium chloroaluminate or calcium chloroferrate to said magnesium-free saline stream and injecting it into a second precipitator through at least one nozzle to form precipitates comprising calcium sulfoaluminate or calcium sulfoferrate;

(ii) removing said precipitates from said magnesium-free saline stream by filtering to produce slurry of said calcium sulfoaluminate or calcium sulfoferrate, and said sodium-potassium chloride saline stream;

(iii) washing, filtering and drying of said slurry of said calcium sulfoaluminate or calcium sulfoferrate;

(d) feeding said sodium-potassium chloride saline stream to desalination methods; or (e) injecting the final blow down brine from said desalination methods into oil-fields for enhanced oil recovery; or (f) injecting said sodium-potassium chloride saline stream into oil-fields for enhanced oil recovery.

11. The method of claim 10 wherein said saline water is seawater, brine from seawater desalination plants, concentrate saline water from evaporation ponds or solar ponds or salt-gradient solar ponds, natural brine, spent water from flue gas desulphurization, agricultural drainage water, or a combination thereof.

12. The method of claim 10 wherein said desalination methods are multi-stage flash, multi-effect, vapor-recompression, reverse osmosis, nanofiltration, vacuum membrane distillation, direct contact membrane distillation, membrane osmotic distillation, or a combination thereof.

13. A method for scrubbing sulfur dioxide from flue gas and precipitating magnesium hydroxide and calcium minerals from a saline stream to produce sodium-potassium chloride saline stream, said method comprising the steps of:

(a) reacting said flue gas with said saline stream to absorb and convert said sulfur dioxide to sulfite, liberate carbon dioxide in a near pure form, and produce alkalinity-free saline stream;

(b) removing said magnesium hydroxide and calcium minerals from said alkalinity-free saline stream by (i) adding calcium chloroaluminate or calcium chloroferrate to said alkalinity-free saline stream and injecting it into a first precipitator through at least one nozzle to form precipitates comprising said magnesium hydroxide and calcium sulfoaluminate or calcium sulfoferrate;

(ii) injecting an amine solvent into said first precipitator through at least one nozzle to enhance precipitates comprising said magnesium hydroxide and said calcium sulfoaluminate or calcium sulfoferrate;

(iii) removing said precipitates from said alkalinity-free saline stream by filtering to produce slurry of said magnesium hydroxide, said calcium sulfoaluminate or calcium sulfoferrate, and said sodium-potassium chloride saline stream;

(iv) washing, filtering and drying of said slurry of said magnesium hydroxide and said calcium sulfoaluminate or calcium sulfoferrate;

(v) removing at least most of said amine solvent from said sodium-potassium chloride saline stream by stripping;

(c) feeding said sodium-potassium chloride saline stream to desalination methods;

(d) injecting the final blow down brine from said desalination methods into oil-fields for enhanced oil recovery; or (e) injecting said sodium-potassium chloride saline stream into oil-fields for enhanced oil recovery.

14. The method of claim 13 wherein said saline water is seawater, brine from seawater desalination plants, concentrate saline water from evaporation ponds or solar ponds or salt-gradient solar ponds, natural brine, spent water from flue gas desulphurization, agricultural drainage water, or a combination thereof.

15. The method of claim 13 wherein said amine solvent is selected from the group consisting of isopropylamine, propylamine, dipropylamine, diisopropylamine, ethylamine, diethylamine, methylamine, dimethylamine, or a combination thereof.

16. The method of claim 13 wherein said desalination methods are multi-stage flash, multi-effect, vapor-recompression, reverse osmosis, nanofiltration, vacuum membrane distillation, direct contact membrane distillation, membrane osmotic distillation, or a combination thereof.

17. A method for scrubbing sulfur dioxide from flue gas and precipitating magnesium hydroxide and calcium minerals from a saline stream to produce sodium-potassium chloride saline stream, said method comprising the steps of:

(a) reacting said flue gas with said saline stream to absorb and convert said sulfur dioxide to sulfite, liberate carbon dioxide in a near pure form, and produce alkalinity-free saline stream;

(b) removing said magnesium hydroxide and calcium minerals from said alkalinity-free saline stream by (i) adding calcium chloroaluminate or calcium chloroferrate to said alkalinity-free saline stream and injecting it into a first precipitator through at least one nozzle to form precipitates comprising said magnesium hydroxide and calcium sulfoaluminate or calcium sulfoferrate;

(ii) removing said precipitates from said alkalinity-free saline stream by filtering to produce slurry of said magnesium hydroxide, said calcium sulfoaluminate or calcium sulfoferrate, and said sodium-potassium chloride saline stream;

(iii) washing, filtering and drying of said slurry of said magnesium hydroxide and said calcium sulfoaluminate or calcium sulfoferrate;

(c) feeding said sodium-potassium chloride saline stream to desalination methods; or (d) injecting the final blow down brine from said desalination methods into oil-fields for enhanced oil recovery; or (e) injecting said sodium-potassium chloride saline stream into oil-fields for enhanced oil recovery.

18. The method of claim 17 wherein said saline water is seawater, brine from seawater desalination plants, concentrate saline water from evaporation ponds or solar ponds or salt-gradient solar ponds, natural brine, spent water from flue gas desulphurization, agricultural drainage water, or a combination thereof.

19. The method of claim 17 wherein said desalination methods are multi-stage flash, multi-effect, vapor-recompression, reverse osmosis, nanofiltration, vacuum membrane distillation, direct contact membrane distillation, membrane osmotic distillation, or a combination thereof.

* * * * *